(12) United States Patent
Hoehn

(10) Patent No.: US 7,954,540 B2
(45) Date of Patent: Jun. 7, 2011

(54) HVAC ASSEMBLY INCLUDING TEMPERATURE MIXING VALVE

(75) Inventor: Garrett Wade Hoehn, Kenmore, NY (US)

(73) Assignee: Delphi Technologies, Inc., Troy, MI (US)

(*) Notice: Subject to any disclaimer, the term of this patent is extended or adjusted under 35 U.S.C. 154(b) by 350 days.

(21) Appl. No.: 12/337,968

(22) Filed: Dec. 18, 2008

(65) Prior Publication Data

US 2010/0155015 A1     Jun. 24, 2010

(51) Int. Cl.
*B60H 1/00* (2006.01)
(52) U.S. Cl. ........ 165/42; 165/43; 165/103; 237/12.3 A; 237/12.3 B; 454/156; 454/160; 454/161; 236/13
(58) Field of Classification Search ................. 165/202, 165/42, 43, 103; 237/12.3 A, 12.3 B; 454/156, 454/160, 161; 236/13
See application file for complete search history.

(56) References Cited

U.S. PATENT DOCUMENTS

| 4,108,376 | A | * | 8/1978 | Matsuda et al. ............... 454/156 |
| 4,383,642 | A | * | 5/1983 | Sumikawa et al. ............. 236/13 |
| 5,106,018 | A | * | 4/1992 | Loup ......................... 237/12.3 B |
| 5,727,731 | A | * | 3/1998 | Arakawa et al. ................. 165/43 |
| 6,758,260 | B2 | | 7/2004 | Clifford |
| 6,979,258 | B2 | | 12/2005 | Doupil, Jr. et al. |
| 7,174,918 | B2 | | 2/2007 | Stevenson et al. |
| 2007/0144728 | A1 | | 6/2007 | Kinmartin et al. |

FOREIGN PATENT DOCUMENTS

| FR | 2547543 A1 | * | 12/1984 |
| JP | 07329543 A | * | 12/1995 |
| JP | 2003034114 A | * | 2/2003 |
| JP | 2006168432 A | | 6/2006 |
| KR | 20080076216 | | 8/2008 |

* cited by examiner

*Primary Examiner* — John K Ford

(74) *Attorney, Agent, or Firm* — Patrick M. Griffin

(57) ABSTRACT

A HVAC assembly includes a temperature mixing valve that comprises a shaft, an upper paddle, a lower paddle, and a yielding means. The upper paddle and the lower paddle attach to the shaft. The yielding means applies a force to keep the upper paddle sealed to prevent cold air in a cold air inlet from entering a mixing zone and the lower paddle moves away from a shared sealing boundary over a predetermined angle of rotation before the upper paddle initially moves to allow cold air to enter the mixing zone. Movement of the lower paddle away from the shared sealing boundary allows cold air to enter a hot air inlet and admix with hot air to mix in the mixing zone to produce non-stratified air.

4 Claims, 5 Drawing Sheets

US 7,954,540 B2

HVAC ASSEMBLY INCLUDING TEMPERATURE MIXING VALVE

TECHNICAL FIELD

This invention relates to a HVAC assembly that includes a temperature mixing valve, more particularly, this invention relates to such temperature mixing valve that includes an upper paddle that seals off cold air from entering a mixing zone, and further includes a lower paddle that moves away from a shared sealing boundary over a predetermined angle of rotation before the upper paddle initially moves, allowing cold air to enter a hot air inlet and admix with hot air in the mixing zone to produce non-stratified air.

BACKGROUND OF INVENTION

It is known, according to prior art Japanese patent JP2006168432 and referring to FIG. 1, that an air conditioner 1 comprises a butterfly-type air mix door 5, and opens and closes the cool air, warm air, and diverting passages, to control the temperature of the air provided to an occupant space.

While the temperature of the air is controlled to a predetermined temperature, an undesired effect is created when dense, cold air from the evaporator does not mix well with the dry, hot air from the heater core, and stratified air is delivered to the occupant space. Stratified air includes distinct layers of hot and cold air insufficiently mixed.

An occupant experiences air flow with hot and cold spots instead of a desired steady flow of non-stratified air at the predetermined temperature.

Therefore, what is needed is a HVAC assembly that includes a temperature mixing valve that controls the temperature of the air to a predetermined temperature and additionally produces a uniform, non-stratified air flow that is delivered to the occupant space.

SUMMARY OF THE INVENTION

In accordance with this invention, an HVAC assembly for heating and cooling an occupant space of a vehicle comprises a HVAC housing duct downstream from a blower that forces air through the housing duct. The HVAC assembly duct contains an upstream cold air evaporator in the HVAC housing to provide cold air blown through a cold air inlet. A hot air heater core downstream of and below the evaporator providing hot air that is blown through a hot air inlet located below, and downstream of, the cold air inlet. The cold air inlet and the hot air inlet are separated by a shared sealing boundary. The HVAC assembly duct also has a mixing zone downstream from the cold air inlet and downstream and above the hot air inlet. A temperature mixing valve is located in the mixing zone, downstream of the cold air inlet and above the hot air inlet. The temperature mixing valve includes an axial shaft. The temperature mixing valve further includes an upper paddle attached to the shaft that seals off cold air from entering the mixing zone through an upper portion of the cold air inlet, and a lower paddle that seals off the lower portion of the cold air inlet by engaging the shared sealing boundary between the hot and cold air inlets. The upper paddle, rather than being fixed as in known butterfly valve assemblies, is yieldably attached to the shaft to allow said lower paddle to move away from said shared sealing boundary first, over a predetermined angle of rotation, before said upper paddle initially moves. This allows a portion of cold air to be received into the hot air inlet across the shared sealing boundary to mix with hot air to mix in the mixing zone before said upper paddle moves and allows cold air directly into the mixing zone, thereby producing non-stratified air within the mixing zone.

BRIEF DESCRIPTION OF THE DRAWINGS

This invention will be further described with reference to the accompanying drawings in which.

DETAILED DESCRIPTION OF THE PREFERRED EMBODIMENT

Figure 1:
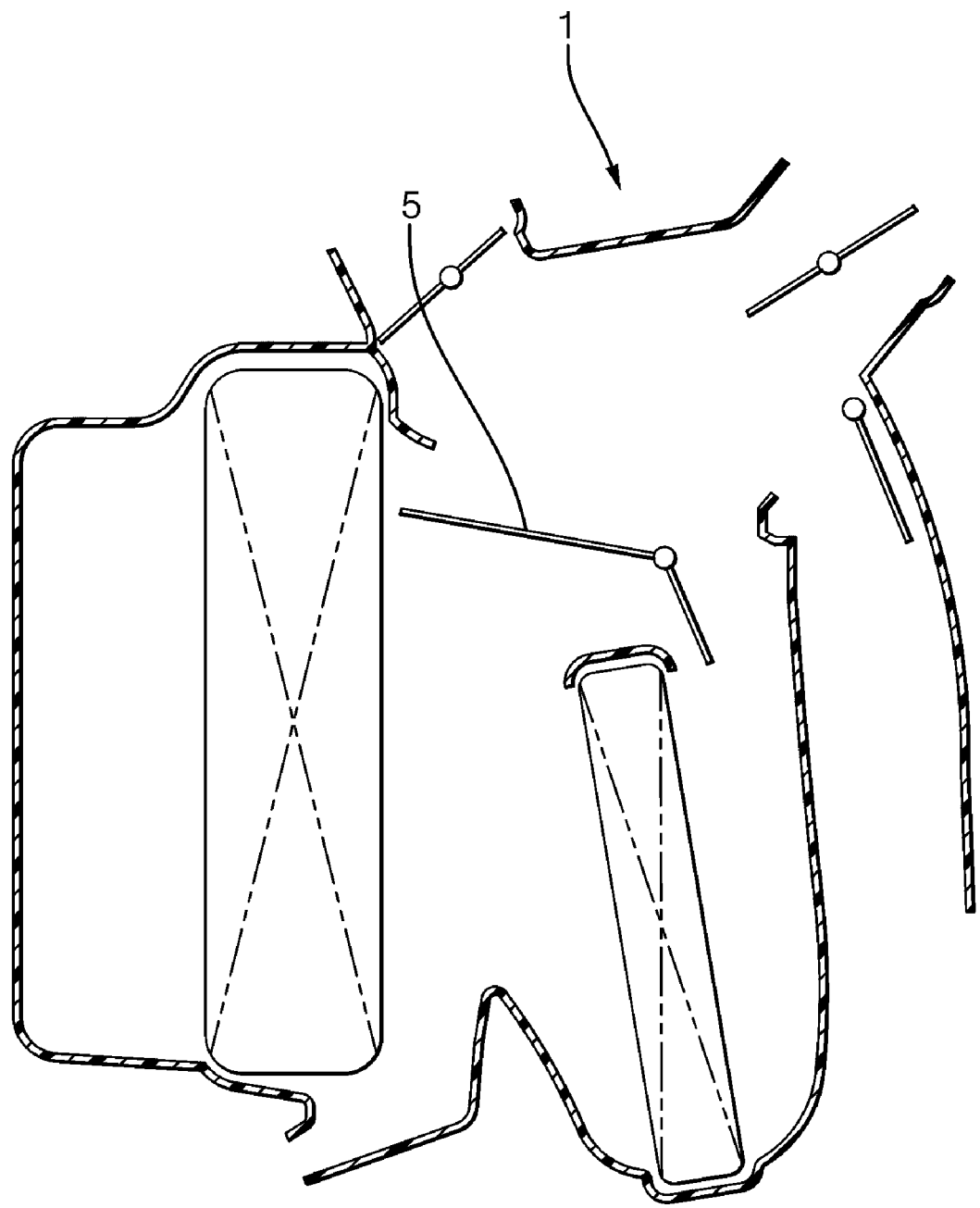
FIG. 1 is a cross section of a prior art HVAC system having a butterfly type air-mix door.
Figure 2:
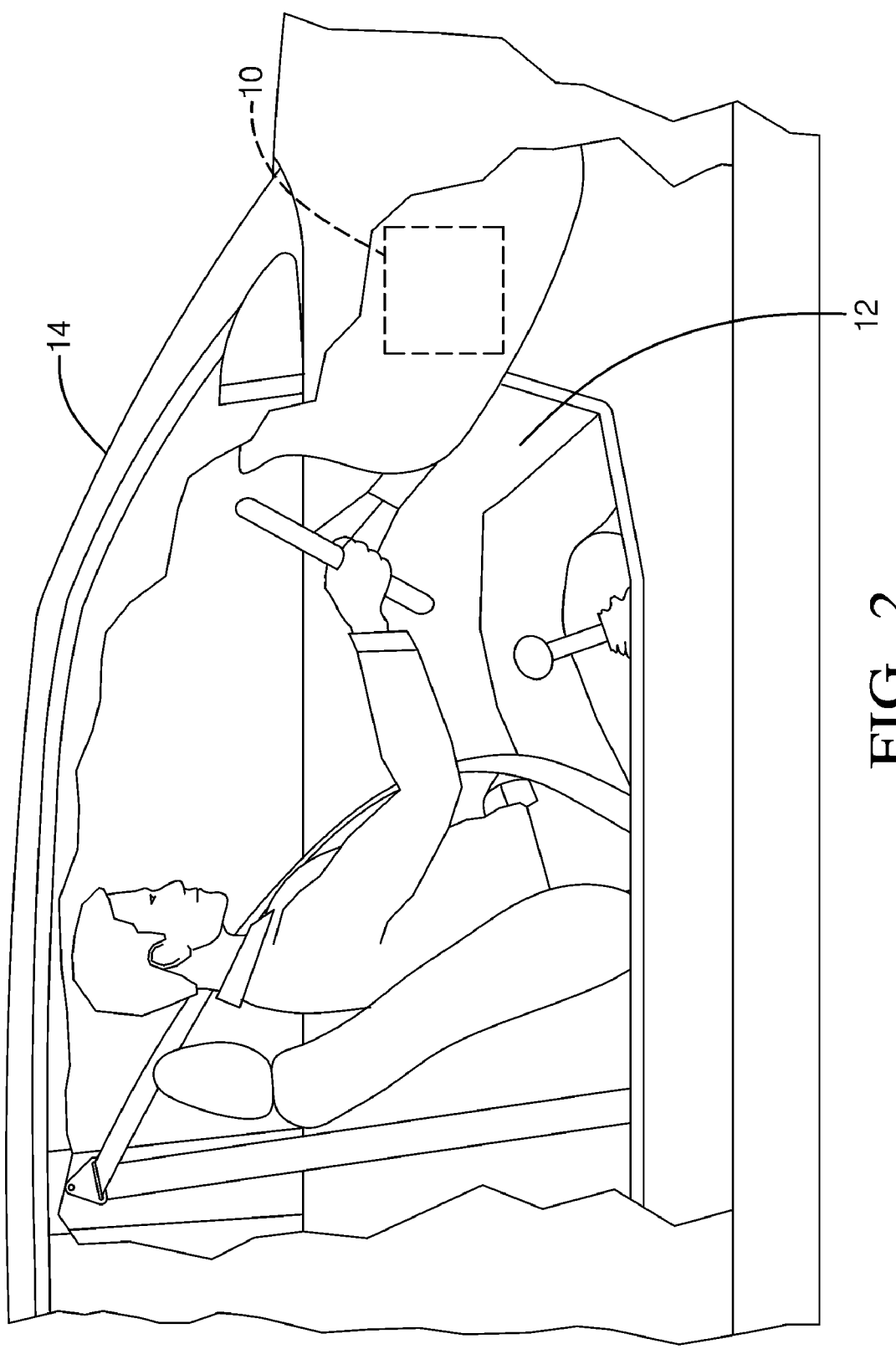
FIG. 2 shows a environmental view of a HVAC assembly in a vehicle in accordance with this invention.

In accordance with a preferred embodiment of this invention, referring to FIG. 2, an HVAC assembly 10 provides conditioned air to occupant space 12 of a vehicle 14.

Referring to FIG. 3-8, an HVAC housing duct 16 is located downstream from a blower 18 that forces air through duct 16. An upstream cold air evaporator 20 in duct 16 provides cold air that is blown through a cold air inlet 22, while a heater core 24 is downstream of, and below, evaporator 20 that provides hot air that is blown through a hot air inlet 26 located below, and downstream of, cold air inlet 22. Hot air inlet 26 and cold air inlet 22 are separated by a shared sealing boundary 28. A mixing zone 30 in duct 16, is located downstream of cold air inlet 22 and also downstream, and above, hot air inlet 26.

Figure 7:
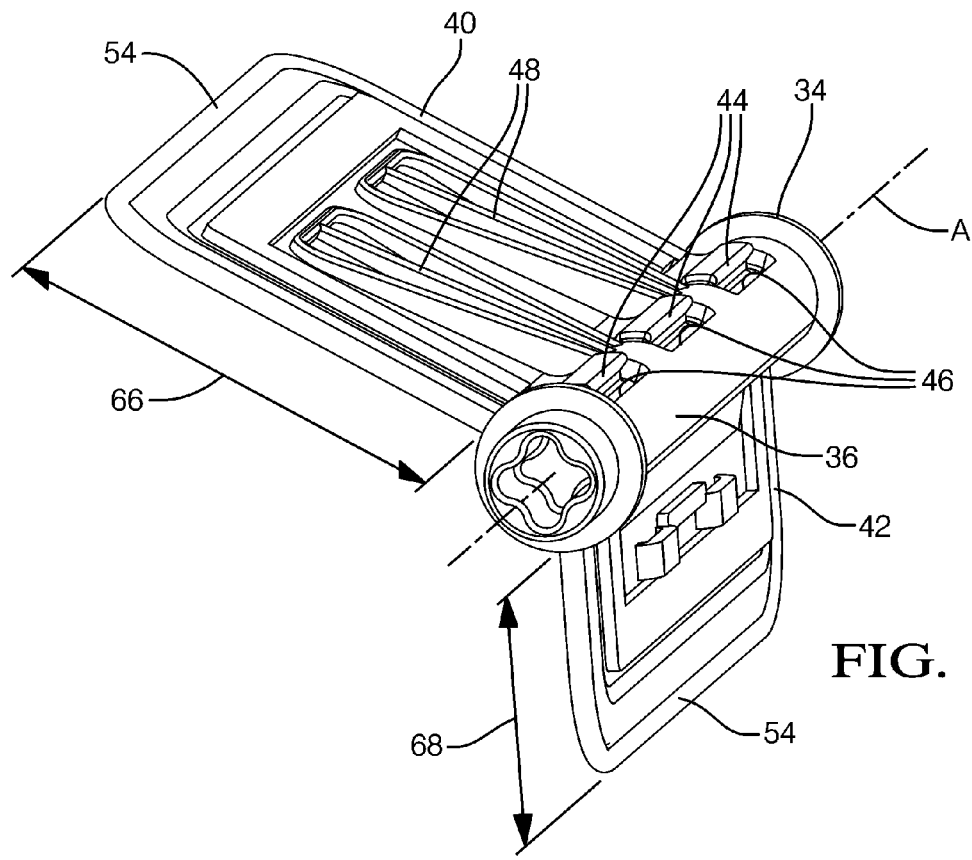
FIG. 7A is a pictorial view of the temperature mixing valve of the HVAC assembly in FIG. 5, showing details thereof, when a plurality of protrusions on a shaft engage an upper paddle.
FIG. 7B is a pictorial view of the temperature mixing valve of the HVAC assembly in FIG. 3, on the side of the valve facing the mixing zone when the plurality of protrusions on the shaft do not engage the upper paddle.
Figure 7:
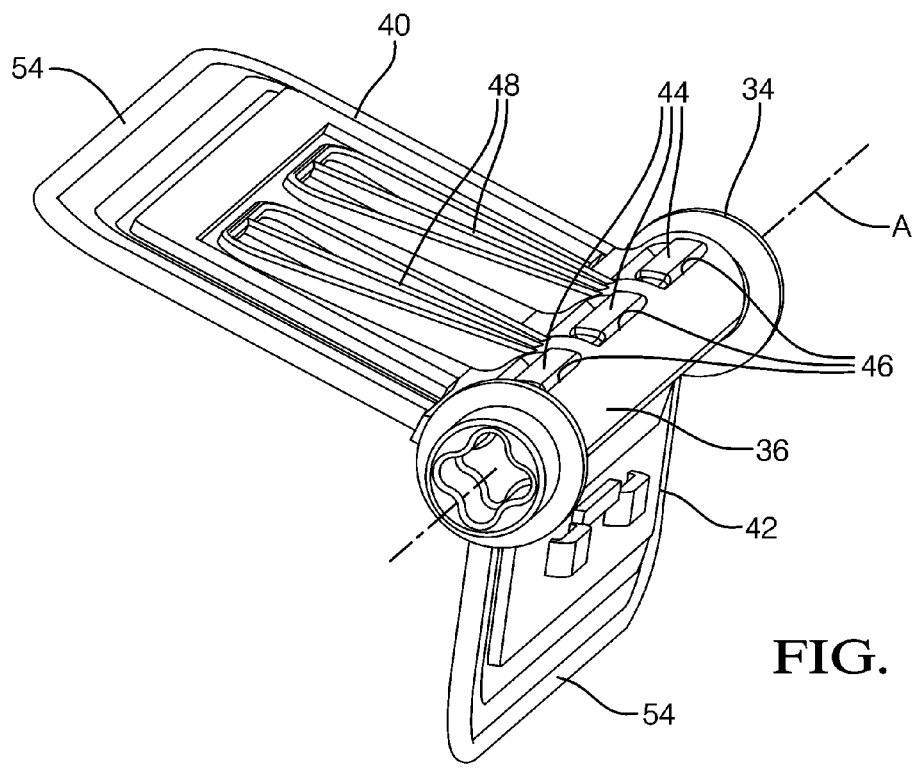
Figure 8:
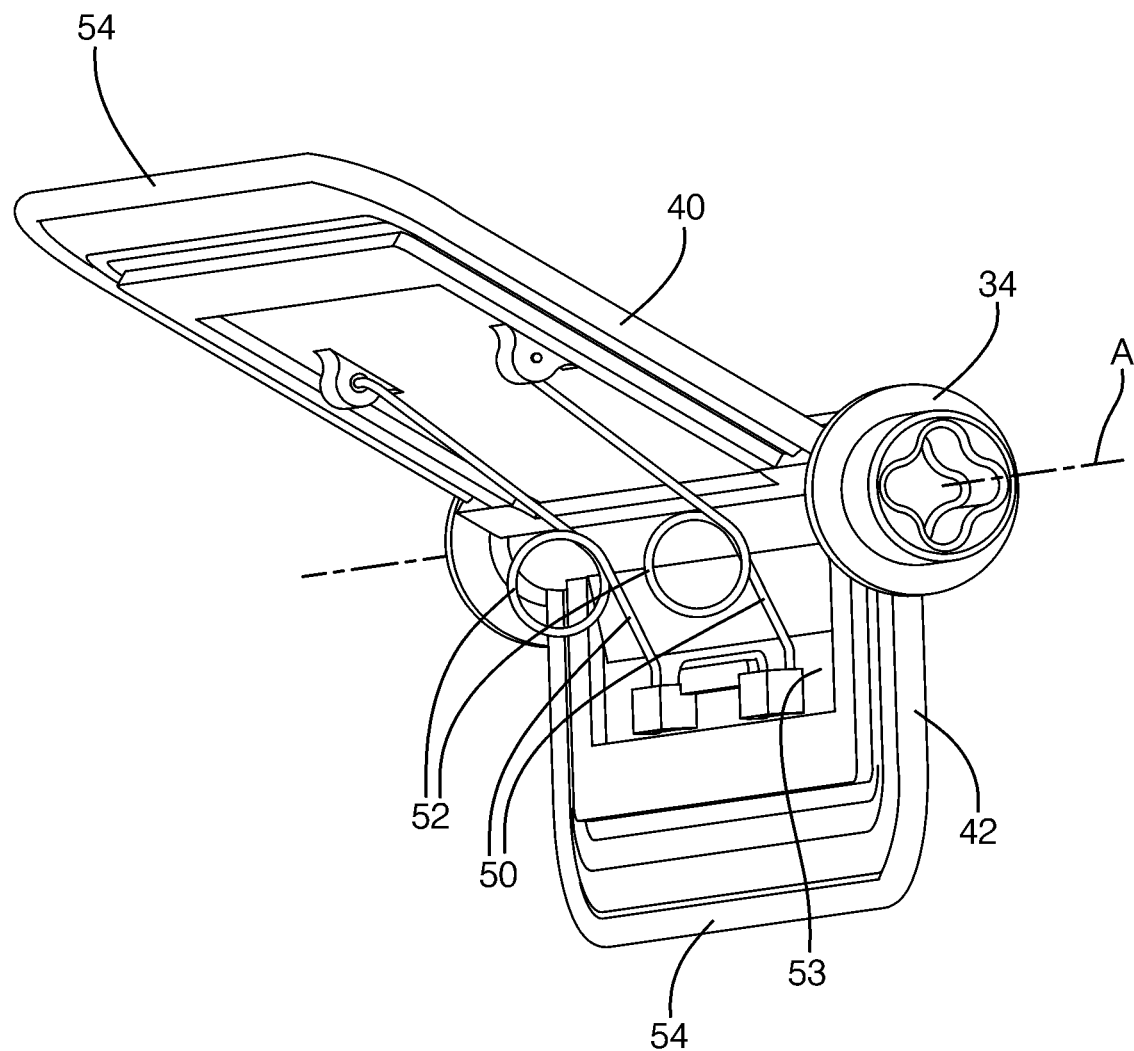
FIG. 8 is a pictorial view of the temperature mixing valve of FIG. 7A, showing details thereof, on the side of the valve facing the cold air inlet.

Referring to FIGS. 7-8, assembly 10 further comprises a temperature mixing valve 32 located downstream of cold air inlet 22 and above hot air inlet 26. Valve 32 is generally a butterfly type, but with an inventive improvement that provides a distinct advantage. Upper paddle 40 is carried on shaft 34 by a journal 36. Shaft 34, which is effectively integrally molded with lower paddle 42, has a plurality of protrusions 44 that fit through a plurality of windows 46 in journal 36. The clearance between protrusions 44 and windows 46 establishes a predetermined angle of rotation 47 through which shaft 34 can initially rotate before upper paddle 40 moves, described in more detail below. Upper paddle 40 also includes reinforcement ribs 48, a yielding means 50, and a termination means 54. Yielding means 50 is a spring loaded hinge means 52. Lower paddle 42 also includes a spring holding means 53 and a termination means 54. Additionally, shaft 34 is adapted to be in connection with a device (not shown) to rotate shaft 34 of valve 32, such as a direct drive motorized actuator (not shown) in assembly 10, or a cable driven by a remote control head (not shown), or any similar device to rotate shaft 34.

Ribs 48 reinforce the structure of upper paddle 40. Preferably, ribs 48 are formed of a 40% talc polypropylene material that is commercially available from Spartech Polycom under the trade name designation F5134T4-1. Spring holding means 53 reinforces structure of lower paddle 42 and holds spring means 52 in place on valve 32. Preferably, spring holding means 53 is formed from a 40% mica polypropylene material that is commercially available from Washington-Penn under the trade designation PPH3 MF-4. Termination means 54 is formed along an edge of paddles 40, 42 remote from shaft 34, and is adapted to prevent air seepage from blowing air when paddles 40, 42 contact boundary 28, and when closing off inlets 22, 26. Termination means 54 is formed of a thermoplastic elastomer. Preferably, termination means 54 is formed of a thermoplastic elastomer material that is commercially available from Advanced Elastomer Systems under the trade designation Vyram 9101-45.

Figure 3:
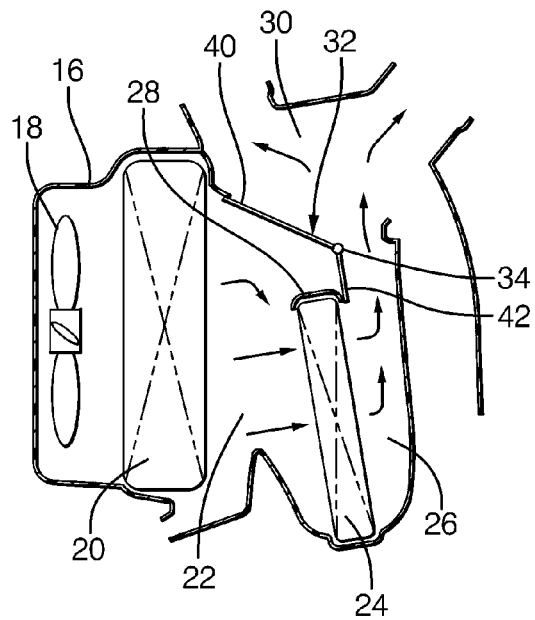
FIG. 3 shows a cross section of the HVAC assembly in FIG. 2, including a temperature mixing valve in the full hot position configuration.

In operation, referring to FIG. 3, upper paddle 40 with aid of a force 58 from spring means 53, remains stationary to seal off cold air inlet 22 from entering mixing zone 30, along with lower paddle 42. Lower paddle 42 is sealed against boundary 28 preventing cold air from entering hot air inlet 26 and hot air inlet 26 is completely open, allowing hot air to heat space 12. Referring to FIG. 7B, protrusions 44 are contained in windows 46 and are located away from shaft 34 and do not engage upper paddle 40. When lower paddle 42 is sealed against boundary 28, valve 32 is in a full hot position configuration. Lower paddle 42 is suitable to open and close hot air inlet 26. Preferably, lower paddle moves along an angle of rotation of about 85 degrees to open or close hot air inlet 26.

Figure 4:
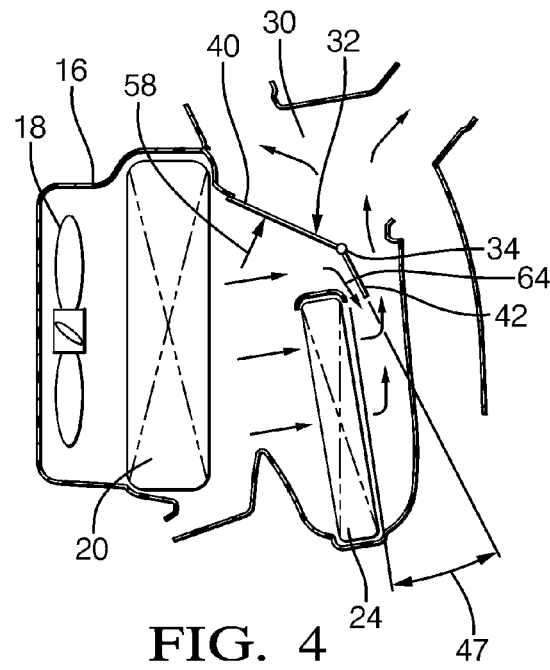
FIG. 4 is a cross section of the HVAC assembly in FIG. 3, showing initial movement of a lower paddle on the temperature mixing valve.

Referring to FIG. 4, as the temperature of air blowing in space 12 is required to become cooler, lower paddle 42 initially moves away from boundary 28 in a clockwise direction to thereby allow a portion of cold air 64 to be received into hot air inlet 26 across boundary 28 to mix in mixing zone 30. Upper paddle 40, with aid of force 58 from spring means 53, does not move until predetermined angle of rotation 47, as referred to above, has been reached. Referring to FIG. 7B, protrusions 44 move from one edge to the other of windows 46 as lower paddle 42 rotates up through predetermined angle of rotation 47. This produces non-stratified air in mixing zone 30 that blows in space 12. A uniform flow of non-stratified air is created with the initial movement of lower paddle 42 away from boundary 28 that forces cold air deep and low into assembly 10 to admix about perpendicular to hot air blowing through hot air inlet 26, with subsequent thorough mixing of the air occurring as air blows through mixing zone 30.

Preferably, predetermined angle of rotation 47 for lower paddle 42 is about 20 degrees away from boundary 28. When lower paddle 42 moves away from boundary 28, the internal pressure in the HVAC assembly drops significantly as cold air is released into hot air inlet 26. The drop in internal pressure is about constant as lower paddle 42 leaves boundary 28 until reaching predetermined angle of rotation 47. With greater rotation of lower paddle 42 past predetermined angle of rotation 47, the internal pressure in the HVAC assembly begins to rise dramatically due to the operation of the upper and lower paddles in the HVAC assembly. The predetermined angle of rotation is optimally chosen while the internal pressure is about constant but before the internal pressure rises dramatically.

Figure 5:
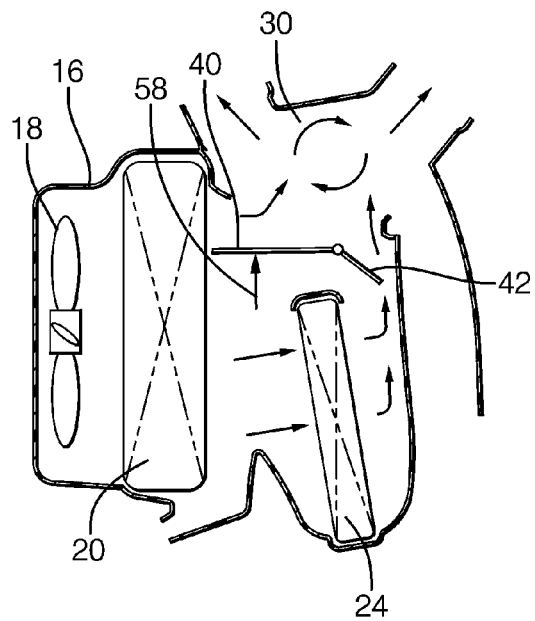
FIG. 5 is a cross section of the HVAC assembly in FIG. 3, showing the lower paddle at a predetermined angle of rotation on the temperature mixing valve.

Referring to FIG. 5, when lower paddle 42 is rotated in a clockwise direction greater than predetermined angle of rotation 47, upper paddle 40 rotates 1:1, moving directly in concert with on shaft 34, and lower paddle 42. Spring means 52, through force 58, maintains pressure against upper paddle 40 that is applied against protrusions 44 to ensure the 1:1 movement between upper paddle 40 and lower paddle 42 when lower paddle 42 is greater than predetermined angle of rotation 47. For example, when predetermined angle of rotation 47 is equal to about 20 degrees, and lower paddle 42 is rotated about 35 degrees from boundary 28, upper paddle 40 opens up cold air inlet 22 for cold air to blow into mixing zone 30 about 15 degrees (not shown).

Figure 6:
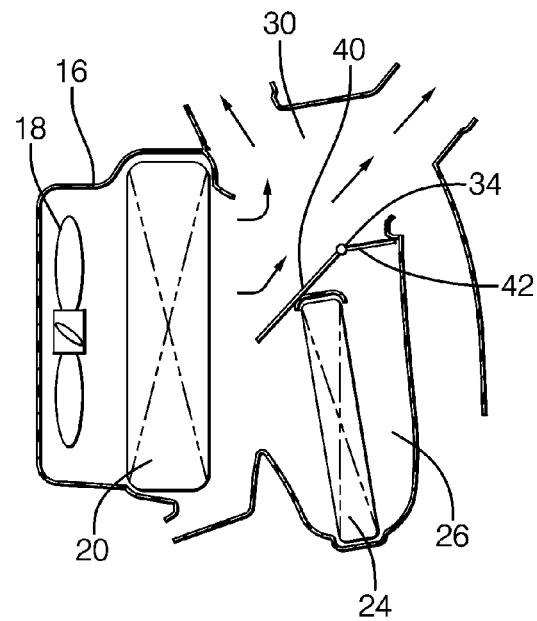
FIG. 6 is a cross section of the HVAC assembly in FIG. 3, including a temperature mixing valve in the full cold position configuration.

Referring to FIG. 6, lower paddle 42 is rotated to completely close off hot air inlet 26 to prevent hot air from entering mixing zone 30. Upper paddle 40 now completely opens cold air inlet 22 to allow cold air to enter mixing zone 30. When upper paddle 40 seals against boundary 28 to completely open cold air inlet 22, lower paddle 42 completely closes hot air inlet 26 keeping hot air from blowing in hot air inlet 26, and valve 32 is in a full cold position configuration. Preferably, upper paddle moves along an angle of rotation of about 65 degrees to open or close cold air inlet 22.

If valve 32 starts in the full cold position configuration, referring to FIG. 6, and the temperature of the non-stratified air is required to be warmer, valve 32 operates as previously described, but moves through valve position shown in FIG. 5, followed by the valve position shown in FIG. 4, until the full hot position configuration is realized, as shown in FIG. 3.

Referring to FIG. 7, upper paddle 40 comprises a first width 66 perpendicular to an axis A through shaft 34, and lower paddle 42 comprises a second width 68 perpendicular to axis A, and first width 66 is greater than second width 68. First width 66 is greater than second width 68 to allow a greater amount of cold air to blow in assembly 10 when valve 32 is in the full cold position configuration as shown in FIG. 6, and a decreased amount of hot air to blow in assembly 10 when valve 32 is in the full hot position configuration as shown in FIG. 3.

While this invention has been described in terms of the preferred embodiment thereof, it is not intended to be so limited, but rather only to the extent set forth in the claims that follow.

I claim:

1. A HVAC assembly for heating and cooling an occupant space of a vehicle, comprising:
    a HVAC housing duct downstream from a blower, said blower moving air through said housing duct;
    an upstream cold air evaporator in the HVAC housing duct providing cold air moving through a cold air inlet,
    a hot air heater core downstream of and below said evaporator providing hot air moving through a hot air inlet below and downstream of said cold air inlet, said hot air inlet and said cold air inlet being separated by a shared sealing boundary;
    a mixing zone in said housing duct downstream of said cold air inlet and downstream and above said hot air inlet; and
    a temperature mixing valve downstream of said cold air inlet and above said hot air inlet, wherein said temperature mixing valve comprises:
        a shaft including an axis;
        an upper paddle attached to the shaft that seals off cold air from entering the mixing zone;
        a lower paddle attached to the shaft that seals against said shared sealing boundary; and a yielding means to allow said lower paddle to initially move away from said shared sealing boundary over a predetermined angle of rotation before said upper paddle initially moves;

whereby a portion of cold air to is received into said hot air inlet across said shared sealing boundary to mix in the mixing zone before said upper paddle moves and allows cold air into the mixing zone, thereby producing non-stratified air within the mixing zone.

2. The HVAC assembly of claim 1, wherein the upper paddle is adapted to remain stationary sealing off the cold air inlet until the lower paddle reaches the predetermined angle of rotation, and thereafter, with rotation of the lower paddle greater than the predetermined angle of rotation, the upper paddle rotates directly with rotation of the shaft.

3. The HVAC assembly of claim 2, wherein the predetermined angle of rotation of the lower paddle is about 20 degrees.

4. The HVAC assembly of claim 1, wherein the yielding means is a spring loaded hinge means.

* * * * *